May 28, 1974 H. W. FERCHLAND 3,813,230
METHOD OF MAKING A POROUS LAMINATED METAL-BONDED CUTTING WHEEL
Original Filed Aug. 9, 1968 5 Sheets-Sheet 1
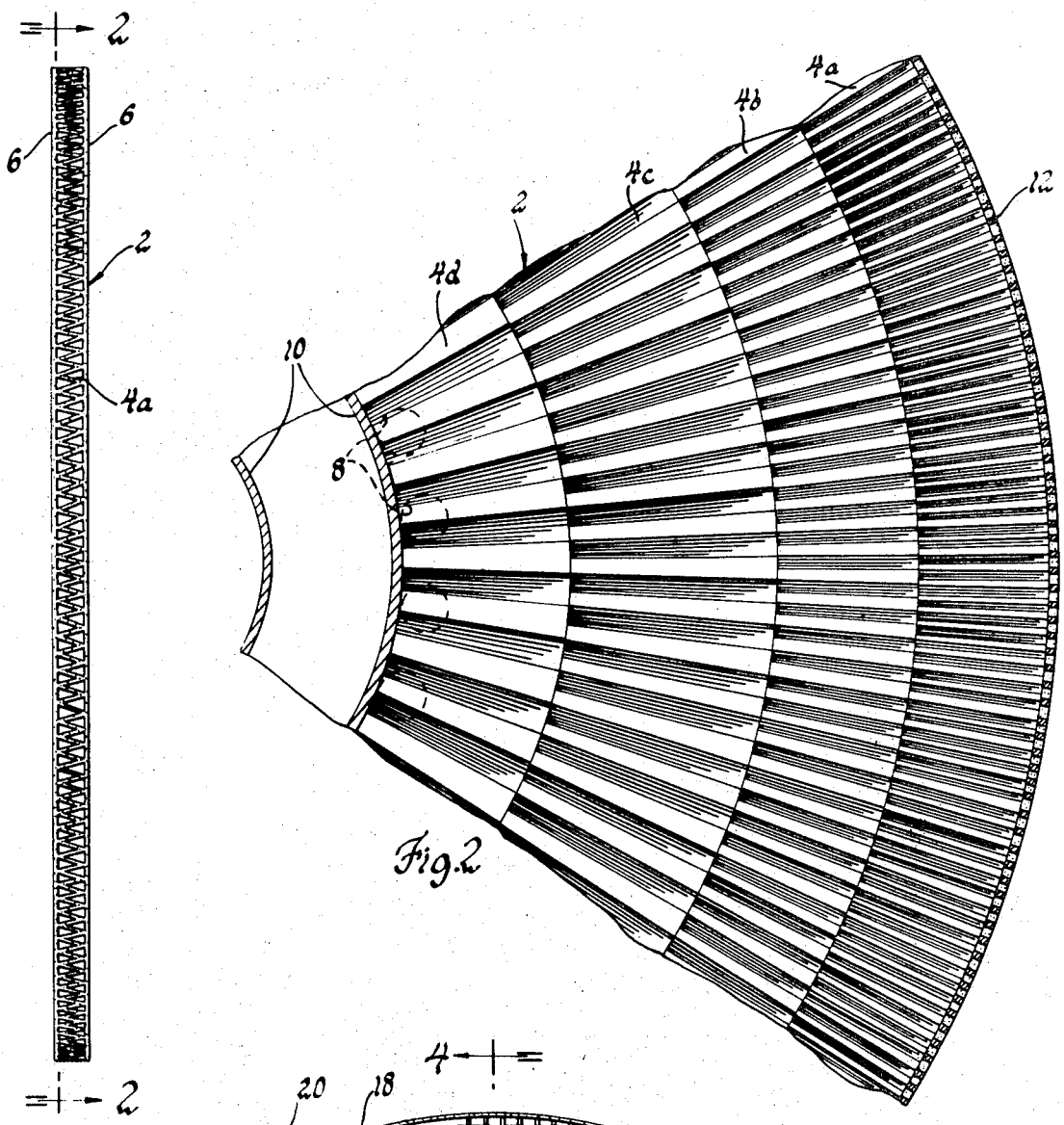
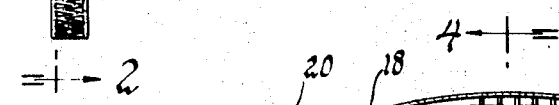
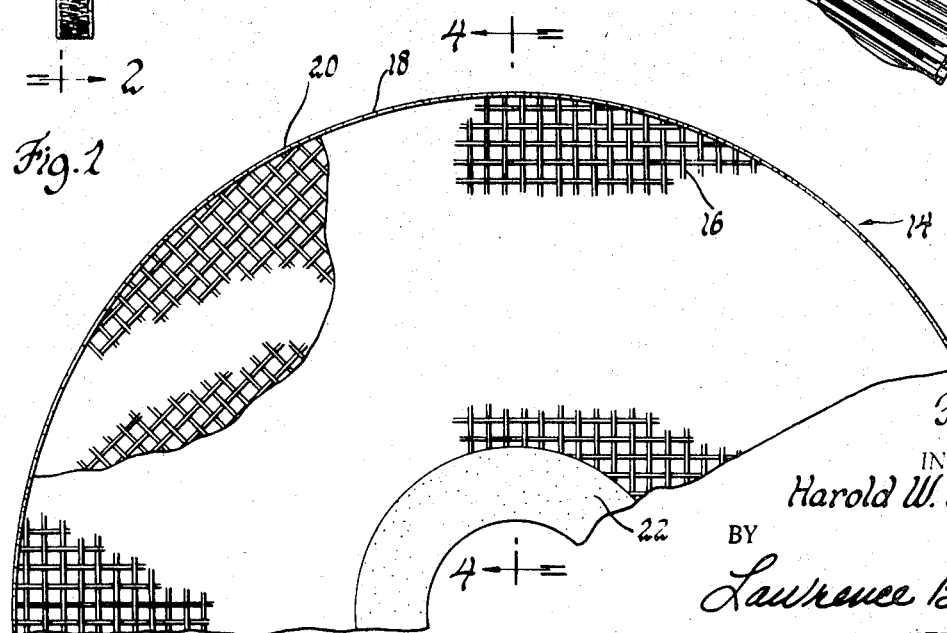
INVENTOR.
Harold W. Ferchland
BY
Lawrence B. Plant
ATTORNEY May 28, 1974 — H. W. FERCHLAND — 3,813,230
METHOD OF MAKING A POROUS LAMINATED METAL-BONDED CUTTING WHEEL
Original Filed Aug. 9, 1968 — 5 Sheets-Sheet 2
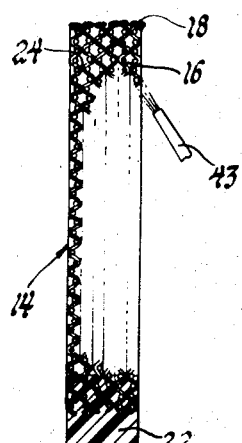
Fig.4
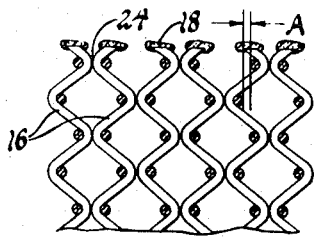
Fig 5
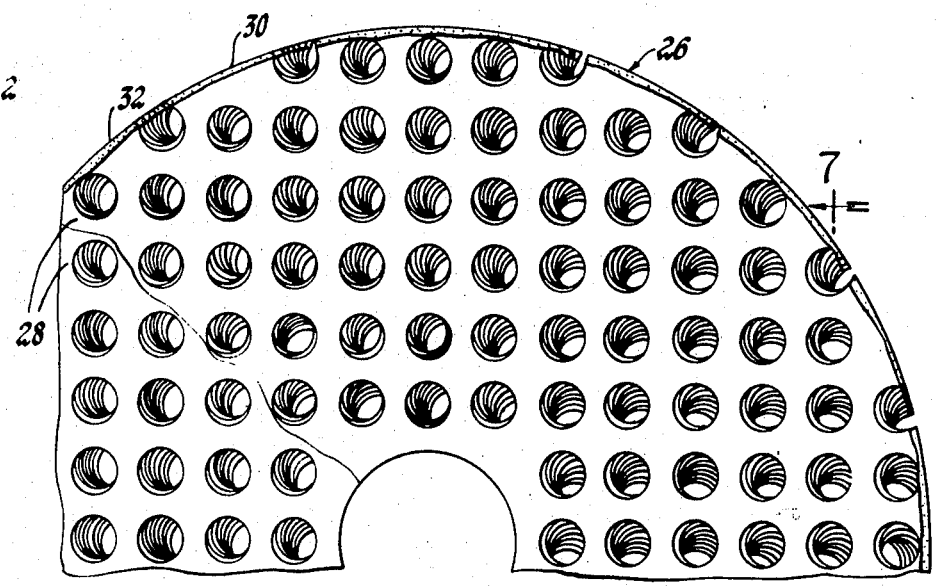
Fig.6
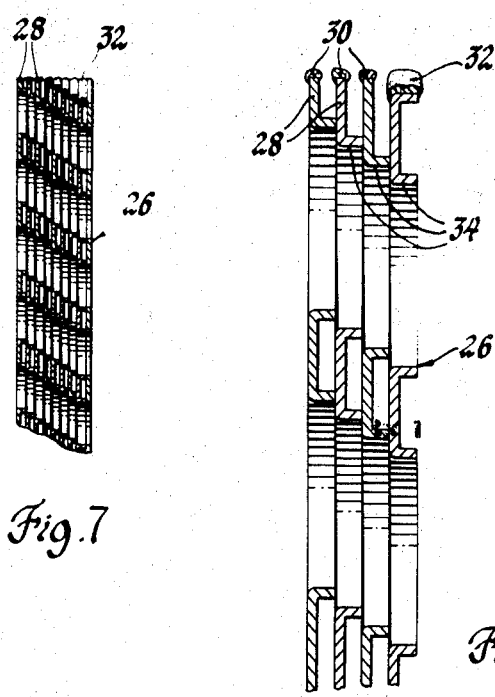
Fig.7
Fig.8
INVENTOR.
Harold W. Ferchland
BY
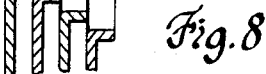
ATTORNEY May 28, 1974   H. W. FERCHLAND   3,813,230
METHOD OF MAKING A POROUS LAMINATED METAL-BONDED CUTTING WHEEL
Original Filed Aug. 9, 1968   5 Sheets-Sheet 3

INVENTOR.
Harold W. Ferchland
BY
Lawrence B. Plant
ATTORNEY

INVENTOR.
Harold W. Ferchland
BY
Laurence B. Plant
ATTORNEY

INVENTOR.
Harold W. Ferchland
BY Lawrence B. Plant
ATTORNEY

United States Patent Office 3,813,230
Patented May 28, 1974

3,813,230
METHOD OF MAKING A POROUS LAMINATED METAL-BONDED CUTTING WHEEL
Harold W. Ferchland, Troy, Mich., assignor to General Motors Corporation, Detroit, Mich.
Application July 31, 1969, Ser. No. 850,314, now Patent No. 3,641,718, which is a continuation of abandoned application Ser. No. 751,479, Aug. 9, 1968. Divided and this application Oct. 27, 1971, Ser. No. 193,226
Int. Cl. B24d 7/10
U.S. Cl. 51—297        2 Claims

ABSTRACT OF THE DISCLOSURE

A cool running abrasive cutting tool having a working surface comprising a layer of diamond particles included in a heat-conductive matrix and a heat-dissipating region immediately subjacent the working surface. The heat-dissipating region is comprised of a highly porous material having a macro-porosity profile, an extended internal heat transfer surface area and preferably is formed from a metal having a thermal conductivity coefficient of at least about 0.05 g.-cal./(sec.)(cm.$^2$)(° C./cm.). A particular electroplated diamond peripheral wheel is disclosed.

---

This application is a division of Ser. No. 850,314, filed July 31, 1969 now Pat. No. 3,641,718 which is a continuation of Ser. No. 751,479 filed Aug. 9, 1968 and now abandoned.

This invention relates generally to grinding or abrasive cutting tools. Though the invention will be described primarily in terms of electroplated diamond peripheral wheels, the principles involved herein are applicable to other diamond wheels and abrasive cutting tools such as cut-off wheels, standard plain wheels, contoured wheels, plain and taper cup wheels, internal wheels, mounted wheels, glass-edging wheels, and masonry wheels. Accordingly, the benefits of this invention can be achieved on equipment such as internal and external grinders, tool grinders, optical grinders, masonry saws, surface grinders, centerless grinders, chip grinders, spline grinders, etc.

In prior art there are generally two types of grinding wheels. The first of these are the ceramic type which are generally high-mass wheels molded into a fused cellular structure by bonding particles, such as Al$_2$O$_3$, together in a glass matrix. Some of these wheels, e.g., such as disclosed in Harrington 2,470,350, permit a limited flow or percolation of coolant through the wheel due to the formation of some microsized passages and pores in the wheel during its manufacture. However, in wheels of this type most of the coolant is concentrated near the sides of the wheel with only a limited amount actually passing through the wheel. Wheels of this type are generally speed limited in that they cannot withstand the destructive forces of high rotational speeds and the stresses of high-speed grinding. Regardless, increasing the wheel speed induces more heat into the wheel and the workpiece. The induced heat shortens the wheel's life and causes workpiece disruptive effects such as surface crazing, high surface stress swelling, and bulging, among others. The second type of grinding wheel is the solid wheel. This type of wheel is typically formed of a solid metal (e.g., aluminum) and has an abrasive working surface. Metal-bonded diamonds or diamonds held in a phenolic resin may form the working surface. The solid wheels are quite strong and accordingly have a higher speed capability than the first-mentioned wheels. Though higher speeds are possible, from a strength standpoint, high speeds induce excessive heat into both the workpiece and the wheel. As more heat is generated under continuous operation the temperature builds in both the wheel and the workpiece until, in the case of the resin-bonded wheels, the bond is destroyed. In the metal-bonded wheels, the rising temperature causes swelling of both the wheel and the workpiece which, if excessive, causes damage to the wheel, to the workpiece and to the grinding machine. It has not heretofore been possible to remove the heat generated at the workpiece-wheel interface at a sufficient rate to substantially increase the cutting rates of the presently commercially available wheels. In a sense then, it might be said that such commercial wheels are heat-limited tools. That is to say, there is an upper limit of cutting rate which cannot be exceeded owing to the prior art's inability to dissipate the generated heat.

It is an object of this invention to overcome both the speed-limited and heat-limited shortcomings of the prior art wheels by providing a wheel which not only cuts faster and cooler than any wheel known heretofore, but which uses less power to do so while at the same time having a longer useful life.

This and other objects of this invention will become more apparent from the detailed description which follows.

Wheels according to this invention have a working surface comprising a layer of diamonds included in a porous heat conductive matrix and a heat-dissipating region or core subjacent that working surface. Diamond, unlike other abrasives, have the distinction of not only having excellent cutting capabilities but also of having an exceptionally high thermal conductivity, i.e., about five times that of copper. The heat-dissipating region is comprised of a material which is replete with macro-sized coolant flow passages to permit the flooding of the working surface with macro-volumes of coolant flowing to it through the heat-dissipating region. Desirably, the heat-dissipating region and the matrix for holding the diamonds are comprised of metals which have a thermal conductivity coefficient of at least about 0.05 g.-cal./(sec.)(cm.$^2$)(° C./cm.) and preferably at least about 0.1 g.-cal./(sec.)(cm.$^2$)(° C./cm.). The heat-dissipating region has a porosity profile such that the interstitial voids, which form the coolant flow passages, are exposed to an extended heat transfer surface area. By porosity profile is meant the nature, configuration, size and distribution of the cells or voids which form the coolant flow passages and make up the void volume of the heat-dissipating region (e.g., cells per lineal inch). The expression "macro-sized" is intended to define sufficiently large passages to permit the macro-volume flow of coolant as distinguished from the low-volume percolation of coolant through micro-porous and/or substantially closed cell structures having only capillary sized passages. The entire wheel may be constructed of the same material as the heat-dissipating region. When the entire wheel is so constructed, then only that portion immediately subjacent the working surface functions as the heat-dissipating region. When it is so constructed, additional benefits are obtained, including a weight reduction which contributes to a savings in power consumption. In its most preferred form the heat-dissipating region is comprised of a porous metal, such as copper, which has a thermal conductivity coefficient of about 0.9 g.-cal./(sec.)(cm.$^2$)(° C./cm.). Other metals and alloys though, such as nickel, iron, aluminum, brass, magnesium, etc., may advantageously be used. In this regard, it has been observed that as the thermal conductivity and the heat transfer surface area of the heat-dissipating region increases, the workpiece takes up less heat and the wheel runs cooler under sustained cutting conditions. This is especially the case where a poor coolant, such as air, is used. As the quality of the coolant improves, the heat transfer surface area can be reduced. By rapidly removing the heat generated, the workpiece and the wheel can be kept below their respective disruptive temperatures.

FIG. 1 is a side view in the radial direction of the wheel shown partially in section in FIG. 2.

FIG. 2 is an enlarged partially sectioned front view taken in the direction 2—2 of the wheel shown in FIG. 1.

FIG. 3 is a partial front view in the axial direction of another wheel according to this invention.

FIG. 4 is a sectioned side view taken in the direction 4—4 of the wheel shown in FIG. 3.

FIG. 5 is an enlarged portion of the sectioned side view of FIG. 4.

FIG. 6 is a partial front view in the axial direction of another wheel according to this invention.

FIG. 7 is a sectional side view in the direction 7—7 of the wheel shown in FIG. 6.

FIG. 8 is an enlarged portion of the sectioned side view shown in FIG. 7.

FIG. 10 is a partially sectioned perspective view of a polishing disc according to this invention.

FIG. 11 is a partially sectioned perspective view of another wheel according to this invention.

Figure 12:
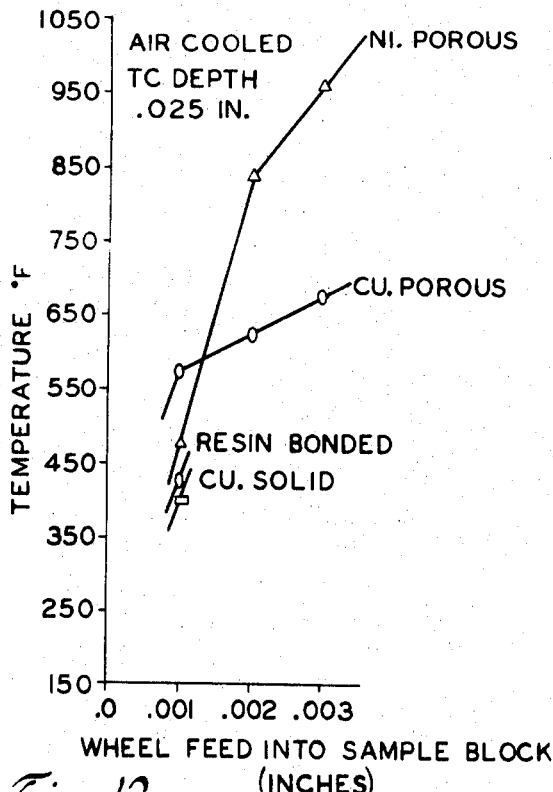
Figure 13:
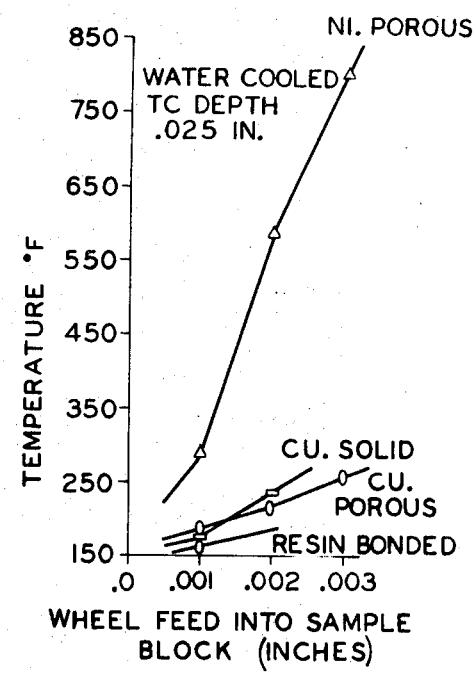

FIGS. 12 and 13 graphically compare the temperature of the workpiece as a function of the wheel feed, the thermal conductivity and the porosity of several diamond wheels.

Figure 15:
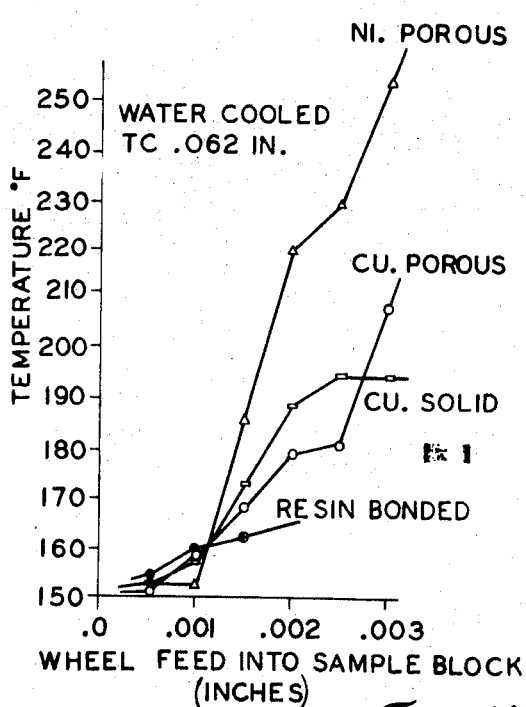
Figure 14:
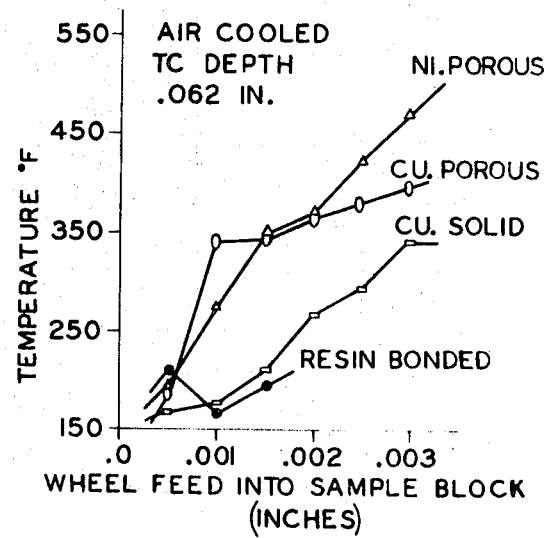

FIGS. 14 and 15, under different conditions from FIGS. 12 and 13, graphically compare the temperature of the workpiece as a function of the wheel feed, the thermal conductivity and the porosity of several diamond wheeels.

Figure 16:
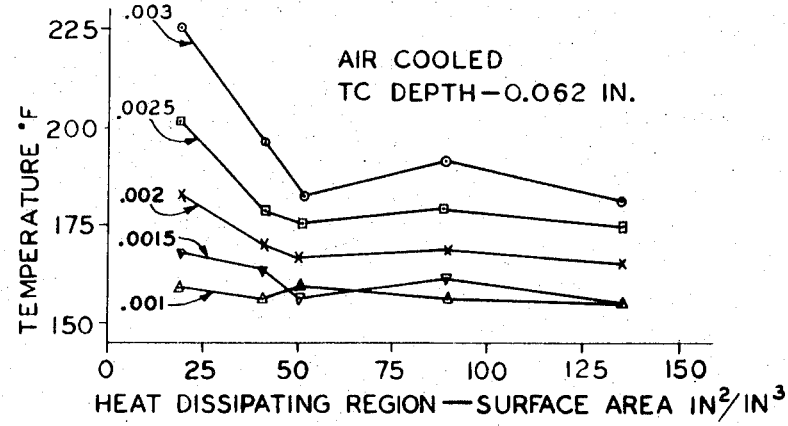
Figure 17:
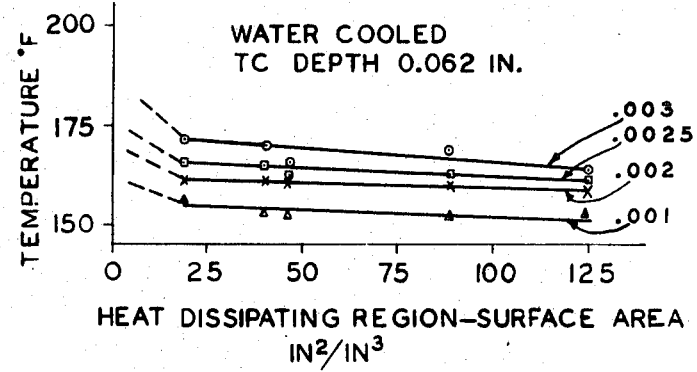

FIGS. 16 and 17 graphically compare the temperature of the workpiece at different depths of cut as a function of the extended heat transfer surface area available for convective heat removal from the heat-dissipating region of the various porous diamond wheels within the scope of this invention.

Figure 18:
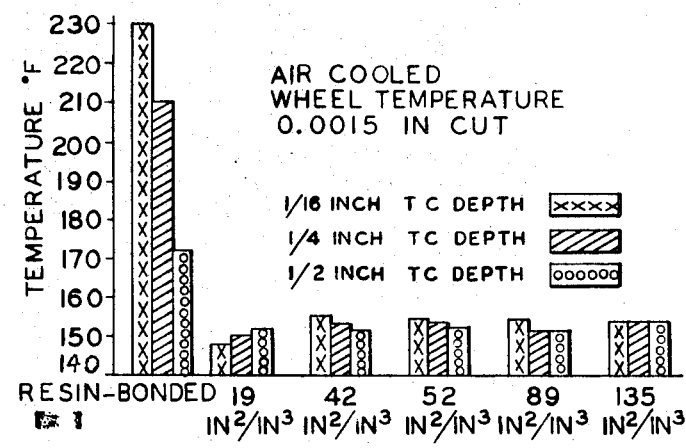

FIG. 18 graphically compares the temperature, at different radial depths, of several wheels having different heat transfer surface areas radially inboard of the cutting surface.

Figure 9:
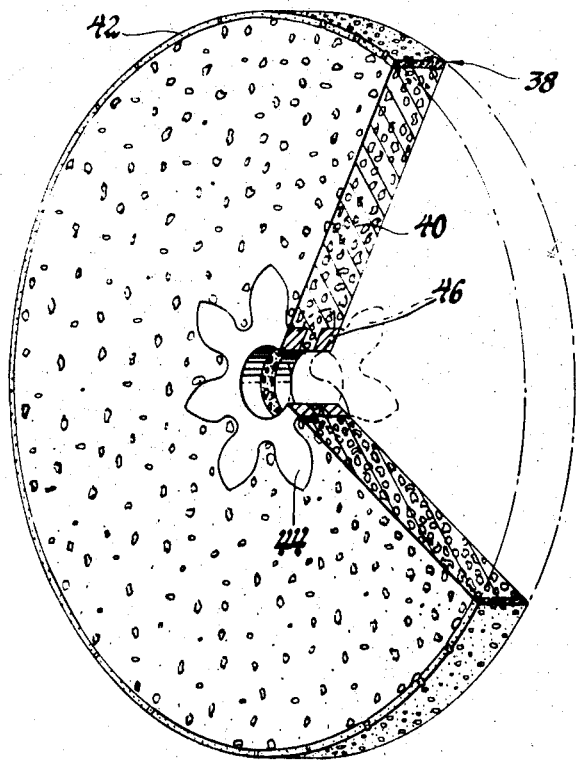
FIG. 9 is a partially sectioned perspective view of another wheel according to this invention.
Figure 20:
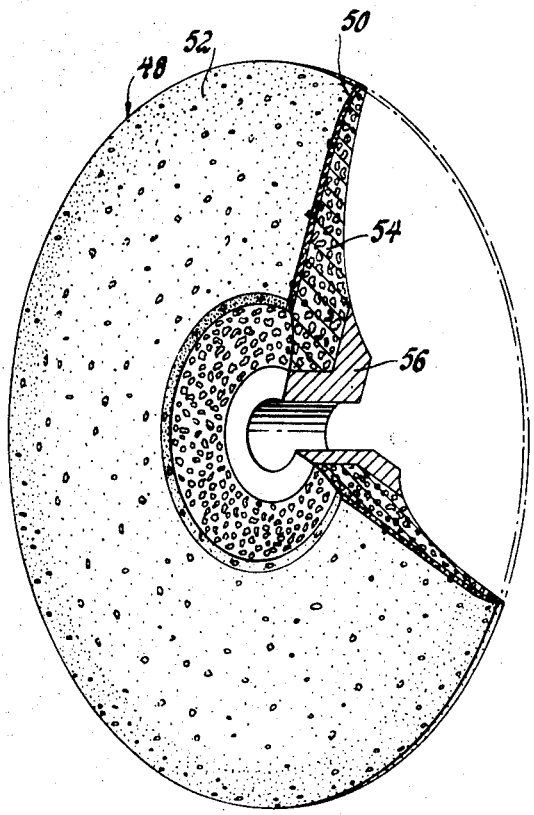
Figure 22:
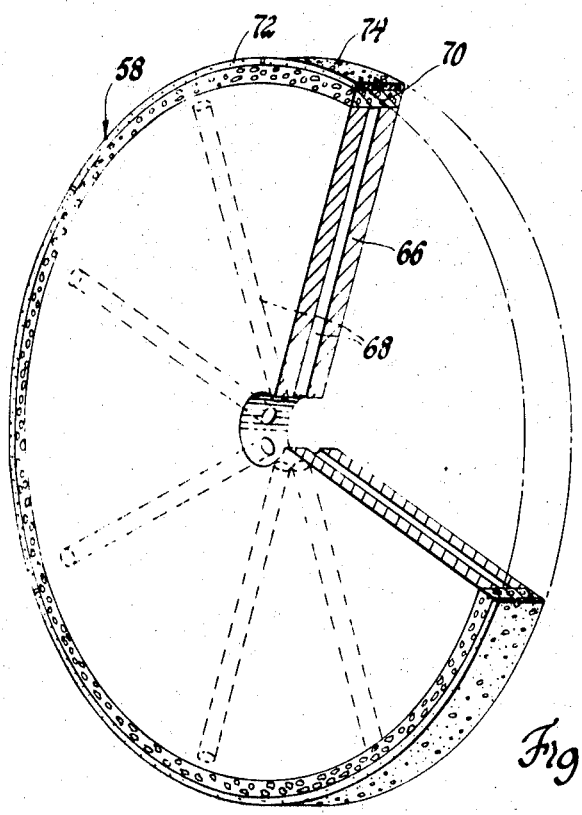

FIG. 9 graphically compares, at different depths of cut, the workpiece temperature when cut with a solid, prior art diamond wheel and a porous diamond wheel of this invention.

FIGS. 1 and 2 disclose one embodiment of a grinding wheel according to this invention. The wheel 2 is comprised of side plates 6 which are separated one from the other by a series of pleated metal ribbons designated as 4a, 4b, 4c and 4d. The side plates 6 are bonded, as by brazing, to the pleated ribbons. As best shown in FIG. 2, the metal content of the wheel can be varied in the radial direction by merely changing the number of pleats per unit length, which are to be placed between the side plates 6. The overall weight of the wheel, its strength, and its heat-dissipating characteristics can be controlled in this manner. The ribbon immediately adjacent the wheel's periphery, i.e., 4a, serves as the principal heat dissipating layer. A number of holes 8 are provided in the side plates 6 and are generally positioned radially inward of the wheel. These holes 8 permit the introduction of a coolant, such as water, into the interstices of the wheel during machining. By centrifugal action the coolant flows radially outward toward the working surface 12. The side plates 6 generally restrict the flow of coolant through the wheel and prevent its loss through the face of the wheel. The hub of the wheel 10, in this embodiment, may be any convenient structure and is not considered to be an integral part of this invention. The peripheral portion of the wheel 2 is the wheel's working surface 12 and is a coating of electrodeposited diamonds. Such coatings result from the codeposition of diamonds with a metal electrodeposit such that the diamonds are included in the electrodeposited metal (e.g., nickel) which functions as a retaining matrix for the diamonds. The working surface 12 is represented in this, and the other drawings, as a distinct layer since it has some finite thicknes, however small. Stippling is intended to show particles. The use of the expression "working surface" hereafter is intended to include the distinct layer, whatever its thickness.

FIGS. 3, 4 and 5 depict a preferred embodiment of this invention. In this embodiment, the wheel 14 is comprised of a number of lamina of wire screen 16. As best shown in FIGS. 4 and 5, the screens are aligned, stacked and brazed together at the joints 24 where the respective screens contact one another. As will be discussed hereinafter, it is preferred to first corrugate the screens. The respective screen lamina are angularly offset one from the other, as by rotating each screen at a different angle about the axis of the center of the wheel. The wheel is provided with a hub, not shown. Before the hub is attached to the wheel, it is desirable to reinforce the central portion of the wheel. This reinforcement is accomplished by impregnating an approximately one inch annulus about the center hole with a thermosetting liquid 22. This feature will be discussed in more detail hereinafter. The wheel has a working surface 20 which is comprised of an abrasive layer 18 of electroplated diamonds. Those portions of the wires immediately subjacent the working surface 20 function as the thermtlly conductive portion of the heat-dissipating region.

FIGS. 6, 7 and 8 depict still another embodiment of this invention. In this embodiment, the wheel 26 is comprised of a number of layers of perforated sheet 28 separated one from the other by spacers 34. In the particular embodiment shown, the spacers 34 are an integral part of the sheet 28 and are formed when the sheets 28 are perforated. Other spacing means, such as wires or dimples formed into the sheets 28, might also be used. The wheel 26 has a working surface 32 comprised of an abrasive layer 30. The respective sheets 28 are offset, one from the other, in the radial direction, as best shown in FIGS. 7 and 8. Likewise, the layers are also offset, one from the other, angularly with respect to the central axis of the wheel, as best shown in FIG. 6. Offsetting of the respective layers insures a substantially continuous path for the coolant flow from the center of the wheel toward the working surface 32, or at least through heat-dissipating regions immediately subjacent the working surface. The perforation density (i.e., number of holes per square inch), especially in the heat-dissipating region immediately below the working surface 32, is dependent upon the amount of heat which must be removed from the workpiece-wheel interface. The perforation density and distribution shown in FIG. 6 is only illustrative and is not intended to indicate any particular critical configuration.

FIGS. 9, 10 and 11 show still further embodiments of tools made in accordance with this invention. In FIG. 9, the entire wheel 38 is comprised of an open-cell porous metal 40 (e.g., nickel) such as described and claimed in copending U.S. patent application Ser. No. 724,544 entitled "Three Dimensional Electroformed Reticulated Latticework" filed in the names of Seymour Katz and Joseph L. Greene on Apr. 26, 1968, and assigned to the assignee of the incident invention. For purposes of a more detailed description of the structure and properties of the aforesaid open cell porous metal, U.S. patent application Ser. No. 724,544 is intended to be herein incorporated by reference. Such wheels have successfully contained 15% by volume nickel and had a porosity profile of about 45 cells per lineal inch. Extended heat transfer surface areas of about 75 in.$^2$/in.$^3$ are obtained. A working surface 42 and resin support (not shown), like that disclosed in conjunction with FIGS. 3, 4 and 5, completes the wheel. A hub insert is comprised of two parts 44 and 46. The two parts 44 and 46 are pressed into the wheel from either side thereof and bonded thereto.

The FIG. 10 wheel 48 is much like that of FIG. 9 in that it is comprised principally of a porous metal 54. However, rather than being a peripheral wheel, the abrasive layer 50 which forms the wheel's working surface 52 is on the face of the wheel 48. With the abrasive on the face, the tool can function as a sanding or polishing disc or the like. The particular contour or shape of the disc is such that the peripheral edge thereof is thinner than the body, hence providing a high degree of flexibility at the periphery of the wheel. This shape is well adapted to sanding and polishing operations. In this mode of operation, material is removed from the workpiece under less severe conditions than under the conditions of peripheral wheel grinding and cutting where the wheels are inflexible, are forced into the workpiece, and have a comparatively small area of contact with the workpiece. It is at this small area where the tremendous heat is generated and must be quickly removed. Another structural variation of this contour could be provided by forming a wheel such as described in FIGS. 3–5 but by reducing the outside diameter of the screen lamina progressively through the wheel from the working surface to the back side of the disc. A hub 56 is bonded to the wheel in a convenient manner.

FIG. 11 is still another embodiment of my invention. In this particular embodiment, the heat-dissipating region 70 is shown as being completely distinct from the central or body portoin 66 of the wheel 58. The heat-dissipating region 70 is immediately below the porous abrasive layer 72 which is working surface 74 of the wheel. The region 70 is comprised of a porous metal of the type described. Virtually all of the heat which enters the wheel is removed in this short distance radially inward of the working surface 74. It is believed that a distance of no more than about $\frac{1}{16}$ inch is required to remove most of the heat (e.g., see FIG. 18). The bulk of the wheel, or central portion 66, may be comprised of any sufficiently strong material to withstand the rigors of a grinding operation. The lighter this material is, the less power is required to drive wheel. Materials such as metals and even certain plastics, are acceptable to comprise the central portion 66. In embodiments such as disclosed in FIG. 11, it is convenient to include a plurality of radial bores 68 in the central portion 66. The radial bores 68 permit the introduction of the coolant into the hub area from which it flows to the working surface 74. Depending on the precise nature of the operation being performed and/or the equipment limitations of the user, coolant may, of course, be introduced into the heat-dissipating region 70 by other means such as coolant jets (e.g., nozzle 43 of FIG. 4) directed into the heat-dissipating region of the wheel from any of a number of directions. This is true for all the wheels disclosed. The volume of coolant should be sufficient to convectively remove the heat produced at the workpiece-wheel interface and conductively transmitted into the heat-dissipating region of the wheel.

The following describes in more detail a specific example of a preferred embodiment, as well as a process for its manufacture. This embodiment is best described in connection with FIGS. 3, 4 and 5. A wheel 14 which is 7 inches in diameter and ½ inch wide is described. The individual layers which form the wheel are comprised of No. 8 mesh copper screen. No. 8 mesh copper screen is woven from 0.028 inch copper wire and produces an opening between the wires of about 0.097″. Strips of the screen are conveniently purchased in rolls. This screen strip is fed through a corrugating machine to crinkle the screen as best shown in FIG. 5. Corrugating or crinkling the screen provides several benefits. It provides a convenient means for spacing the many layers of screen, one from the other in the final stack or laminated structure. The spacing provides a plurality of substantially continuous, relatively non-tortuous passage from inside the wheel extending towards the working surface 20. The spacing also reduces the number of screen layers needed to make a wheel having a given thickness (i.e., ½ inch). This in turn reduces the mass of the wheel. As shown at A of FIG. 5, it is generally preferred to corrugate the screen to an amount equal to about the thickness of the wires used in making the screen. From the corrugated screen, blanks of appropriate diameter are punched out. Simultaneously, a center hole is punched into each blank. The screens are next dusted with a brazing powder. For copper screens, I prefer to use a nickel-phosphorous brazing powder sold by Wall Colmonoy Corporation under the name of Nicrobraz 10. An appropriate number of screens are assembled and stacked in a fixture for alignment and holding during the brazing step. For the ½ inch wheel, about 17 layers of corrugated screen are required which produce an effective heat transfer surface area in the heat dissipating region of about 52 square inches per cubic inch ($in.^2/in.^3$) of porous metal or laminated screen. The metal content of this porous region is about 36% by volume copper. The screens are rotated about the center of the wheel and with respect to each other to insure a substantially uniform distribution of wires ends on the periphery or working surface of the wheel. Likewise, the rotation of the screens provides a more tortuous flow path through the wheel in the axial direction than in the radial direction. This insures a better radial flow of coolant. A weight is applied to the stack in the fixture so as to press the respective layers close together during brazing to insure a uniformly thick wheel. The stack is placed in a brazing furnace and appropriately treated to bond the layers together. After the brazing operatoin the wheel is prepared to receive a hub. The center hole is reinforced by impregnating an approximately one inch annulus about the center hole with a thermosetting liquid, such as Scottweld EC–2214. The thermosetting liquid is then cured in accordance with the manufacturer's instructions. For Scottweld EC–2214, curing is accomplished by heating for 40 minutes at 250° C. A Teflon plug is preferably placed in the center hole to keep it clean and free of thermosetting liquid during the casting and curing step thereof. After curing, the plug is removed and the wheel hub hole is reamed to the desired hole size which, for a 7 inch wheel, is preferably 1.25 inch. Subsequently, the wheel is trued to insure its concentricity with the hub. Next, the wheel is cleaned, as by a vapor blast or fine standblast, to remove all small metal fragments from the wire ends, which may have developed during the trueing process. At this time, any necessary solvent degreasing of the wheel is also accomplished. The wheel is appropriately masked to insure that only the working portions of the wheel receive the electro-codeposited diamond. Many suitable masks or stop-off materials, such as waxes, lacquers, etc., are available to those skilled in the art. I generally prefer to use lacquers. After the lacquer has dried on the wheel, portions thereof are removed so plating can proceed where the lacquer has been removed. Lacquer removal is conveniently accomplished by means of a motor-driven rotary wire brush. The diamonds are next plated onto the wheel. It is generally preferred to plate to a depth of about ⅛ inch into the interstices of the wheel. This is conveniently controlled by temporarily plugging the balance of the pores with an inert filler such as wax or resin. It is preferred to use a nickel-diamond codeposition process, though clearly others such as copper-diamond, may also be used. A typical codeposition bath and its plating conditions are described below.

| | |
|---|---|
| Nickel sulfate hexahydrate | 330 g./l. |
| Nickel chloride hexahydrate | 45 g./l. |
| Boric acid | 37 g./l. |
| Sodium low sulfate | 0.1 g./l. |
| Coumarin | 0.1 g./l. |
| Diamond abrasive (G.E. Rvg 80–100 grit) | 100 g./l. |
| pH | 2.5. |
| Temperature | 60° C. |
| Anodes | Pure nickel. |

For plating the periphery of a wheel, the wheel is made the cathode in the electrolytic codeposition bath. The bath is kept agitated, as by a propeller suspended in the solution, to keep the diamonds suspended in the solution. Current density varies from 60 amp./ft.$^2$ to 10 amps./ft.$^2$ during the plating cycle with closer control required near the end of the cycle after the diamond deposit has increased. It is prefered that the thickness of the nickel deposit be greater than about 50% of the diamond mean diameter size but not greater than 100%. Better diamond retention results. After cleaning and removal of the masking and filler materials, the wheel is balanced.

Wheels made in accordance with the procedure recited above were tested by grinding a piece of "KT" silicon carbide ceramic. The test piece was a tubular cylinder having an outside diameter of 5.788 inches, an inside diameter of 3.750 inches and a length of 1.625 inch. The silicon carbide had a hardness rating of 13 on the Moh's scale. Grinding was performed on the end across the diameter of the piece using water as a coolant. The coolant flowed through the heat dissipating region of the wheel at a rate of about 0.22 gal./min. The stock removal rate was 0.004 inch per pass of the wheel over the part for a total stock removal of 2.0 in.$^3$ in 42.3 min. A similar test was run on the same material using a commercial resin-bonded diamond wheel which removed only 0.001 inch per pass of the wheel and only 0.8 in.$^3$ of stock in 6 hrs.

It appears that the superior performance of these wheels is the result of a concerted interaction between conductive and convective heat transfer mechanisms in the working surface and the heat-dissipating region of the wheel. It has been observed that diamond wheels which were otherwise substantially structurally identical but made of materials having different thermal conductivities performed differently with respect to the amount of heat which was transmitted into the workpiece. The thermal conductivity of the material which comprised the heat-dissipating region in these wheels appeared to be a very significant variable. In this regard FIGS. 12–15 show that during sustained grinding at constant wheel speed and coolant flow rate (air or water), the amount of heat transmitted into the workpiece was generally inversely proportional to the thermal conductivity of the material comprising the heat dissipating region of the wheel. For example, FIGS. 12–15 show that porous heat-dissipating regions comprised of copper transmitted less heat into the workpiece than those comprised of nickel. FIGS. 12–15 further show that only the wheels of this invention could dissipate the heat rapidly enough to permit accurate deeper cuts to be taken. This is true for both dry (air) and wet (water) test runs. For example, in the series of tests reflected by FIGS. 12 and 15 neither the solid nor the resin-bonded wheels could withstand the thermal punishment of deeper wheel feeds of a test block. In the FIGS. 12 and 13 tests, the porous wheels of this invention were ½ inch wide by 7 inches in diameter and were comprised of nickel and copper respectively with diamonds plated on its working surface. The porous wheels each had a metal content of about 36% by volume metal and about 50 in.$^2$/in.$^3$ of heat transfer surface area in the heat-dissipating region. The solid copper wheel had diamonds plated on its periphery and represented wheels having a maximum conductive heat removal capability but a minimum of convective heat removal capability. The resin bonded wheel was of the commercially available D–120 P100 B⅛ type in which the diamonds are held in a ⅛ inch layer of phenolic resin on an aluminum alloy wheel. The wheels were tested wet (water cooled) and dry (air cooled). The tests involved grinding stock off one of the 2 inch x 4 inch faces of a 1 inch x 2 inch x 4 inch sample blocks of GM46M tool steel heat treated to a hardness of 60–62 R$_c$. In the center of one 2 inch x 4 inch face a blind hole was drilled to within 0.025 inch from the opposite face (i.e., the face to be ground). Constantan thermocouples were mounted in these holes. 0.001 inch, 0.002 inch, and 0.003 inch cuts were taken as indicated by the adjustment on the advancing mechanism and the corresponding temperature at each cut recorded. Actual stock removal was determined after each series of tests. The machine, which was a Do All wet and dry surface grinder, had an operating speed of 3400 r.p.m., a table translation rate of 38 cycles per minute, and a table cross feed of 0.020 inch per cycle. For the wet tests, water was used at a rate of 0.22 gallon per minute. Similar tests were conducted to determine the data reflected in FIGS. 14 and 15, except that in these latter tests the thermocouples were placed 0.062 inch from the surface being ground and the cutting was done in 0.0005 inch increments between 0.0005 inch and 0.003 inch cuts. Because of the new location of the thermocouple, there was a downward shift of the temperatures recorded. Further, in the second test series the solid copper wheel was provided with a nylon sleeve in the otherwise metal hub hole. This sleeve provided a slight protective cushioning effect not present in the first series of tests.

In the first dry test of the porous nickel wheel (FIG. 12), the wheel was successively fed 0.001, 0.002 and 0.003 inch, respectively, into the block in the manner indicated. When the block returned to room temperature, it was remeasured and found that a total of 0.0058 inch stock was removed as compared to the 0.006 inch wheel feed. Slight wheel wear was indicated which is normal for all grinding wheels during their initial use. The recorded temperatures are as plotted.

In the first dry test of the solid copper wheel (FIG. 12) the wheel was successively fed 0.001, 0.002, and 0.003 inch, respectively, into the block in the manner indicated. The actual stock removal as measured after cooling was 0.0057 inch. Like the nickel wheel, slight wheel wear was indicated. The recorded temperatures are as plotted.

In the first dry test of the solod coper wheel (FIG. 12) the test was terminated after the first 0.001 inch cut. The heat was generated so fast that the wheel grew radially and caused it to overcut more than the 0.001 inch. Though wheel feed was only 0.001 inch, actual stock removal was 0.003 inch. No meaningful correlation could be made between the approximate stock removal and temperature since the difference between the wheel feed and the actual stock removal was so great.

In the first dry test of resin bonded commercial wheels (FIG. 12) the test was terminated after the first 0.001 inch cut. The heat generated by the 0.001 inch cut caused the phenolic resin binder to decompose and release the diamonds from the bond. The actual metal removal was 0.0004 inch.

In the first dry test of the solid copper wheel (FIG. 13), the wheel was successively fed 0.001, 0.002 and 0.003 inch, respectively, into the block in the manner indicated. The total stock removed was 0.0058 inch as compared to the total 0.006 inch wheel feed. The wheel showed signs of less wear than in the dry grinding test. The recorded temperatures are as plotted.

In the first wet test of the porous copper wheel (FIG. 13), the wheel was successively fed 0.001, 0.002 and 0.003 inch, respectively, into the block in the manner indicated. The total stock removed was 0.0058 inch as compared to the total 0.006 inch wheel feed. The recorded temperatures are as plotted.

In the first wet test of the solid copper wheel (FIG. 13), the wheel was successively fed 0.001 and 0.002 inch, respectively, into the block in the manner indicated. In this test the wheel grew radially and the test was stopped after the second cut (0.002). In this test, when the wheel was fed into the sample block 0.002 inch, the actual metal removed was 0.0048 inch. The recorded temperatures were as plotted but no meaningful correlation can be made between the temperature and the depth of cut owing to the complete loss of dimensional control.

In the first wet test of the resin bonded commercial wheel (FIG. 13) the wheel was fed 0.001 inch into the block in the manner indicated. In this test the heat generated caused the phenolic bond to weaken and release the diamonds. The 0.001 inch wheel feed yielded only a 0.0006 inch stock removal. Further, the heat genertated was more by way of friction than grinding. The recorded temperature was as plotted, but no meaningful correlation can be made between this temperature and the depth of cut.

In the second dry test of the porous nickel wheel (FIG. 14), the wheel was successively fed 0.0005, 0.0010, 0.0015, 0.0020, 0.0025 and 0.0030 inch, respectively, into the block in the manner indicated for a total of 0.0105 inch and removed 0.0100 inch of stock. The recorded temperatures were as plotted.

In the second dry test of the porous copper wheel (FIG. 14), the wheel was successively fed 0.0005, 0.0010, 0.0015, 0.0020, 0.0025 and 0.0030 inch, respectively, into the block in the manner indicated for a total of 0.0105 inch. The actual stock removal was 0.0100 inch. The recorded temperatures were as plotted.

In the second dry test of the solid copper wheel (FIG. 14), the wheel was successively fed 0.0005, 0.0010, 0.0015, 0.0020, 0.0025 and 0.0030 inch, respectively, into the block in the manner indicated for a total of 0.0105 inch. The actual stock removed was 0.0155 inch. The recorded temperatures were as plotted. The installation of the aforementioned nylon bushing or sleeve allowed the solid copper wheel to safely run through the entire test since the nylon apparently acted somewhat like a buffer and countered the effects of the radially growing wheel. However, like before, substantial overcutting and loss of dimensional control was encountered and no meaningful correlation can be made between the temperature and the depth of cut.

In the second dry test of the resin-bonded commercial wheel (FIG. 14), the wheel was successively fed 0.0005, 0.0010, 0.0015, 0.0020, 0.0025 and 0.0030 inch, respectively, into the block in the manner indicated for a total of 0.0105 inch. The actual stock removal was 0.0035 which indicated that the wheel was no longer effective and had broken down after the 0.0015 inch cut. The recorded temperatures were as plotted.

In the second wet test of the porous nickel wheel (FIG. 15), the wheel was successively fed 0.0005, 0.0010, 0.0015, 0.0020, 0.0025 and 0.0030 inch into the block in the manner indicated for a total of 0.0105 inch. The actual stock removed was 0.0100 inch. The recorded temperatures were as plotted.

In the second wet test of the porous copper wheel (FIG. 15) the wheel was successively fed 0.0005, 0.0010, 0.0015, 0.0020, 0.0025 and 0.0030 inch into the block in the manner indicated or a total of 0.0105 inch. Actual stock removal was 0.0095 inch. The recorded temperatures were as plotted.

In the second wet test of the solid copper wheel (FIG. 15), the wheel was successively fed 0.0005, 0.0010, 0.0015, 0.0020, 0.0025 and 0.0030 inch, respectively, into the block in the manner indicated for a total of 0.0105 inch. Actual stock removal was 0.018 inch. The recorded temperatures were as plotted.

In the second wet test of the resin-bonded commercial wheel (FIG. 15), the wheel was successively fed 0.0005, 0.0010, 0.0015, 0.0020, 0.0025 and 0.0030 inch, respectively, into the block in the manner indicated for a total of 0.0105. The actual stock removed was 0.0025 inch. Breakdown of the phenolic bond began at about the 0.001 inch cut.

As a result of these tests, it was concluded that during sustained grinding operations the solid copper wheels acted as heat sinks. The solid copper wheels initially removed considerable heat from the working surface of the wheel. The workpiece itself also absorbed some of this heat. However, over an extended machining operation, the absorbed heat increased the temperature of the wheel causing radial swelling thereof. This swelling caused over-cut of the workpiece as well as established a potentially dangerous situation in which either the spindle could be damaged, the workpiece caused to fly off the table, or both. The use of the nylon bushing in the second series of tests reduced and hazard but also introduced another variable into the test. As the temperature in the solid wheel increased, the heat removal rate into the wheel decreased and the temperature of the workpiece rose. For the deeper wheel feeds virtually all dimensional control was lost. It was reasoned that this occurred because the temperature difference, $\Delta T$, between the working surface and the region subjacent that surface was continually decreasing thereby reducing the heat removal rate. Under sustained cutting conditions the wheel grew rapidly and uncontrollably increased the depth of cut and caused overheating of the workpiece. With wheels made in accordance with this invention, the diamonds are thermal conductors and the dissipating region immediately below the working surface is comprised of a material which has a relatively high thermal conductivity, a high porosity, and an adequate porosity profile for rapid heat removal. Wheels of this invention did not swell as do the solid wheels. Rather the test results indicate that with wheels of this invention, increased cooling results from a rapid conductive removal of heat from the workpiece via the diamonds and thermally conductive matrix forming the working surface and from the working surface via the thermally conductive heat dissipating region contiguous the working surface; that this heat is conducted deep (e.g. about $\frac{1}{16}''$) into the heat-dissipating region; and that therein a substantial amount of convective heat removal occurs incident to the extended heat transfer surface area in the heat-dissipating region. The tremendous heat generated at the point of contact between the diamond and the workpiece is rapidly transmitted through the thermally conductive diamond at rates in excess of about $4(-dt/dx)$ per unit area of diamond in contradistinction to being insulated from the heat-dissipating region by a substantially less conductive abrasive particle such as $Al_2O_3$ or a carbide. Not only is a considerable amount of heat thus conducted through the particle but a cumulative benefit rate-wise is obtained by having the temperature of the metal in the heat-dissipating region kept low resulting in a higher temperature gradient $(-dt/dx)$ between the working surface and the heat-dissipating region. For purposes of obtaining these benefits, it appears that not only should the abrasives be heat-conducting diamonds but also the matrix holding the particles and the heat dissipating region should be comprised of materials having a high thermal conductivity and that an extended heat transfer surface area should be provided in the heat-dissipating region to convectively remove the heat conductively transmitted into this region. Though, for the heat-dissipating region, I prefer the use of copper which has a thermal conductivity coefficient of about 9.9 g.-cal./(sec.)(cm.$^2$)(° C./cm.) nickel, which has a thermal conductivity of about 0.14 g.-cal./(sec.)(cm.$^2$)(° C./cm.) has performed satisfactorily. Iron alloys, steels and alloy steels have conductivities not distant from nickel and are also acceptable materials of construction. Other alloys may also be used, but are usually not available in an acceptably porous form. The alloyed materials frequently have thermal conductivities as low as 0.05 g.-cal./sec.) (cm.$^2$) (° C./cm.). I prefer electrodeposited matrices such as nickel or copper for bonding the diamonds but other metals and other matrix forming techniques (e.g., sintering or brazing) may be used.

Other tests (FIGS. 16, 17) have shown that the amount of heat transfer surface area in the heat dissipating region is quite significant and is largely dependent on the nature of the coolant being used. In this regard, FIG. 16 shows that when using a poor coolant, such as air, the internal heat transfer surface is quite significant. If low workpiece temperatures for deep cuts are to be obtained with air-cooling, this area should be at least about 40 in.$^2$ of area per cubic inch of heat-dissipating region and preferably about 50 in.$^2$/in.$^3$. The family of curves shown in FIG. 16 represents the temperatures of a number of identical workpieces each cut at different depths with different copper screen wheels. The depth of cut is shown for each curve. The thermocouples were located 0.062 inch from the surface being cut. The several wheels were substantially identical in all aspects except the internal heat transfer surface area which was varied. In this regard, five 7 inch porous copper wheels (i.e., FIG. 3) were used. The first wheel had a volumetric metal content of 38 percent and an internal heat transfer surface area of about 19 in.$^2$/in.$^3$ of heat-dissipating region. The second wheel had a volumetric metal content of 34 percent and an internal heat transfer surface area of about 42 in.$^2$/in.$^3$. The third wheel had a volumetric metal content of 37 percent and an internal heat transfer surface area of about 52 in.$^2$/in.$^3$. The fourth wheel had a volumetric metal content of 34 percent and an internal heat transfer surface area of about 89 in.$^2$/in.$^3$. The fifth wheel had a volumetric metal content of 34 percent and an internal heat transfer surface area of about 135 in.$^2$/in.$^3$.

The results shown in FIG. 17 were determined in much the same manner as those for FIG. 16, except that water was used as a coolant and flowed through the heat-dissipating regions at a rate of 0.22 gal./min. The wheels used were the same. FIG. 17 shows that the workpiece will cut cooler with increased internal heat transfer surface areas. When compared to FIG. 16, FIG. 17 further shows that, with an excellent coolant such as water, the internal surface area requirements are less stringent than when using lesser quality coolants, but that there nonetheless is a need for some convective outlet for the heat within the interstices of the heat dissipating wheel. Though that outlet can be less for a wet-wheel than for a dry-wheel, it still must be substantially more than that provided by a solid-wheel (e.g., see dotted line projections). It is significant to note that the low surface area wheels had large interstitial voids and used thick-wired screen which provided a working surface having large pockets of diamonds surrounded by large voids rather than a more uniform distribution of diamonds and voids found when using smaller pored materials. The more uniform distribution provides a better, more efficient heat dissipator.

Further benefits are obtained when the coolants are caused to impinge on the workpiece at the diamond-workpiece cutting interface so that there is more convective heat removal right at the diamond-workpiece cut where the temperatures are highest. More coolant, of course, increases the thermal benefits but may introduce a hydrodynamic variable into the machining operation which could be undesirable. Regardless, wheels of this invention are considerably more flexible with respect to the quality and quantity of coolant that can effectively be used in the deep cutting operations where heat generation has heretofore been the principal limiting factor.

Still further tests were conducted to determine the effectiveness of the heat removal mechanism in the wheels of this invention as compared to that of a conventional commercially available resin-bonded wheel. One such test is reflected in FIG. 18. The data reflected in the bar graphs of FIG. 18 was determined by placing thermocouples in each wheel at locations 0.0625 inch, 0.250 inch and 0.500 inch radially inboard of the working surface. A 0.0015 inch cut was then taken with each wheel and the temperature within the wheel sensed. In the resin-bonded or commercial wheel the temperature near the working surface was the greatest. The wheel was progressively cooler at the 0.250 inch and 0.500 inch depths as shown in FIG. 18. The five wheels made in accordance with this invention, also shown in FIG. 18, showed very little temperature difference between the 0.062 inch depth and the 0.500 inch depth which indicates the extremely effective heat removal capacity of these wheels to remove the heat in the first 1/16 inch of the heat-dissipating surface. It is further noted that in all cases shown, the wheels of this invention at the 1/16 temperature-sensing strata ran substantially cooler than the resin-bonded commercial wheel at the 1/2-inch temperature-sensing strata.

Figure 19:
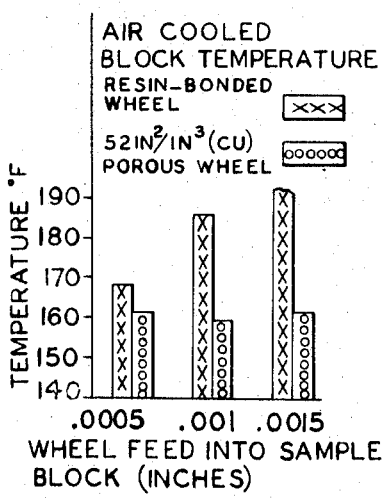

FIG. 19 reflects other data obtained and compares the workpiece temperature (0.062 inch thermocouple depth) at different cutting depths when successive 0.0005, 0.0010 and 0.0015 cuts were taken with a commercial resin-bonded wheel and a preferred wheel made in accordance with this invention. This data shows that the resin-bonded wheel could not withstand deeper cuts and accordingly the test was terminated after the 0.0015 cut. Regardless, FIG. 19 shows that the temperature of the workpiece rose appreciably as the depth of cut was increased using the resin-bonded wheel but that with the wheel of this invention and at these comparatively low cutting depths the workpiece temperature remains substantially constant at a temperature substantially below that generated with the commercial wheel. Further, with the wet wheel, improved workpiece cooling results from high volumes of coolant thoroughly flooding the working surface from within the wheel to an extent not heretofore known. This form of flooding significantly improves the heat removal such that the wheels and the workpieces can withstand much more rigorous and severe machining conditions.

A still further advantage is found in these wheels. In this regard, the porous layer beneath the working surface permits the metal chips removed from the workpiece to readily move into the voids and thereby precludes loading of the wheel which causes reduced cutting and generates more heat than an unloaded wheel. While still in the voids, the heat contained in the chips is readily removed, and as the wheel rotates out of contact with the workpiece the chips are flushed from the interstices of the porous subsurface by the flowing coolant.

The entire wheel could be formed of the porous material which comprises the heat-dissipating region. That is to say, the heat-dissipating portion can be an integral extension of the body portion. When the entire wheel is thusly formed, it has a relatively low mass. Because of the lower mass, less power is required to accelerate the wheel. Further, because of the improved cutting efficiencies the same jobs can be performed at a power savings. Where power consumption and shipping weight are a major consideration, magnesium and aluminum are excellent candidates for the heat dissipating region both because of their lightness and because of their 0.4 and 0.5 g.-cal./(sec.)(cm.$^2$)(° C./cm.) thermal conductivity coefficients. Porous metal wheels have sufficient structural integrity as to be considerably stronger than bonded or vitrified wheels, even at high rotational speeds. High speeds are possible because the porous metal wheels have stronger bonds in relation to the overall low mass of the wheel. These higher rotational speeds result in faster cutting rates. Higher rotational speeds, of course, tend to produce more heat. If this additional heat could not adequately be removed, then the improved speed capability would provide no advantage. As indicated though, wheels of this invention actually do provide an improved means for rapidly removing the heat generated, thereby avoiding excessive temperature buildup in both the wheel and the workpiece. Accordingly, the wheel of this invention transcends the heat limited infirmity of solid wheels.

Several other observations were made with respect to the operation of this wheel. First, and quite significantly, the diamond-plated embodiment of this wheel can be used quite satisfactorily in the grinding of hardened steel or mild steel as well as carbides, ceramics, concrete, glass and plastics. Most manufacturers of present commercially available diamond-plated wheels now caution the user against the cutting of steels, owing to the tendency of the wheel to "load up" resulting in the ultimate loss of the wheel. For this reason, steel has commercially been ground almost exclusively with alumina wheels. Still another advantage noted with respect to the wheels of this invention is the fact that the porous nature of the heat-dissipating region substantially reduces the formation of hydrodynamic films between the workpiece and the wheel except at extremely high coolant flow rates. These hydrodynamic films, so common to solid and near solid wheels, reduce the effectiveness of the wheels. The wheels of this invention are also useful for electrochemical machining wherein electrolyte flows through the wheel. However, the full mechanical cutting and heat-dissipating capabilities of my wheels are not completely utilized in the ECM environment since the bulk of the metal removal occurs by electrolytic, rather than mechanical action.

Cutting tools remove stock from a workpiece by a chip-producing process, in contradistinction to workpiece erosion by friction technically characteristic only of grinding tools. Regardless, many diamond tools are frequently called "grinders" when, in fact, they are chip producers and accordingly might better be classed as abrasive cutting tools. Since, however, the industry apparently does not make this distinction and has adhered to the misnomer "grinder," it is herein intended that the term "grinding" be interpreted in the same sense as it has been accepted in the industry. Accordingly, the word "grinding" is considered to be descriptive of a stock removal process involving a single or a series of small cuts taken in a workpiece with a plurality of abrasives and is intended to include such functions as are normally accomplished by such tools as surface grinders, abrasive cut-off wheels, abrasive saws, etc.

While this invention has been described solely in terms of certain specific embodiments thereof, I do not intend to be limited thereto but rather only to the extent defined hereafter.

I claim:

1. A method of making a highly porous laminated cutting wheel having a working surface on its circumferential periphery and a heat-dissipating metal region contiguously underlying said working surface, said heat dissipating metal region having a thermal conductivity of at least about 0.05 g.-cal./(sec.)(cm.$^2$)(° C./cm.) and being sufficiently porous to permit macro-volume flow of coolant therethrough and out said working surface, comprising the steps of: pressing a plurality of discrete porous metal discs together into a compact stack of said discs each face-to-face and contiguous the next adjacent disc in said stack; metal-bonding the faces of each disc to the faces of the next adjacent discs to unite said discs one to the other without substantially affecting their porosity and to thereby form a porous laminate of said metal discs, said laminate having a circumferential peripheral surface portion formed by the peripheral edges of said discs; and securing a layer of diamonds in a metal matrix to said circumferential surface portion to form said working surface without substantially plugging the pores of said laminate immediately subjacent said surface.

2. The method according to claim 1 wherein said discs comprise wire screens and including the steps of corrugating said screens prior to said stacking.

References Cited

UNITED STATES PATENTS

| | | | |
|---|---|---|---|
| 2,376,254 | 5/1945 | Humphrey et al. | 51—309 |
| 3,377,150 | 4/1968 | Corley | 51—293 |
| 2,290,631 | 7/1942 | Buchmann | 51—309 |
| 2,361,492 | 10/1944 | Pare | 51—309 |

DONALD J. ARNOLD, Primary Examiner

U.S. Cl. X.R.

51—309

UNITED STATES PATENT OFFICE
CERTIFICATE OF CORRECTION

Patent No. 3,813,230      Dated May 28, 1974

Inventor(s) Harold W. Ferchland

It is certified that error appears in the above-identified patent and that said Letters Patent are hereby corrected as shown below:

Column 1, line 42, after "In" and before "prior" insert -- the --. Column 2, line 26, "Diamond" should be -- Diamonds --. Column 3, line 15, "sectional" should be -- sectioned --; line 32, the word "wheeels" should be -- wheels --; line 43, "FIG. 9" should be -- FIG. 19 --. Column 4, line 3, "thicknes" should be -- thickness --; line 27, "thermtlly" should be -- thermally --. Column 5, line 27, "portoin" should read -- portion --; line 39, after "drive" and before "wheel" insert -- the --. Column 6, line 20, "wires" should be -- wire --; line 29, "operatoin" should be -- operation --; line 36, delete "C." after "250°" and insert -- F. --; line 38, "step" should be -- steps --; line 43, "standblast" should be -- sandblast --. Column 7, line 5, the formula reading "60 amp./ft.$^2$" should be -- 60 amps./ft.$^2$ --; line 19, "Moh's" should be -- Mohs' --. Column 8, line 20, "nylon" should be -- Nylon --; line 32, delete "solid" and insert -- porous --; line 39, delete "solod coper" and insert -- solid copper --; line 54, delete "dry" and insert -- wet -- and delete "solid copper" and insert -- porous nickel --. Column 9, line 8, "genertated" should be -- generated --; line 31, "nylon" should be -- Nylon --; line 33, "nylon" should be -- Nylon --; line 56, "or" should be -- for --. Column 10, line 8, "nylon" should be -- Nylon --; line 9, delete "and" and insert -- the --. Column 14, line 28, (In the Claims), "steps" should be -- step --.

Signed and sealed this 19th day of November 1974.

(SEAL)
Attest:

McCOY M. GIBSON JR.
Attesting Officer

C. MARSHALL DANN
Commissioner of Patents